United States Patent [19]

Fedorovish et al.

[11] Patent Number: 5,701,166

[45] Date of Patent: Dec. 23, 1997

[54] ACTIVE MATRIX LIQUID CRYSTAL DISPLAY HAVING FIRST AND SECOND DISPLAY ELECTRODES CAPACITIVELY COUPLE TO SECOND AND FIRST DATA BUSES, RESPECTIVELY

[75] Inventors: Ogurtsov Oleg Fedorovish; Kazurov Boris Ivanovich, both of Moscow, Russian Federation

[73] Assignee: LG Electronics Inc., Seoul, Rep. of Korea

[21] Appl. No.: 534,688

[22] Filed: Sep. 26, 1995

[30] Foreign Application Priority Data

Sep. 26, 1994 [RU] Russian Federation .......... 94307146

[51] Int. Cl.$^6$ ................................. G02F 1/1343
[52] U.S. Cl. ................................. 349/38; 349/48
[58] Field of Search .................... 349/38, 48, 42, 349/39

[56] References Cited

U.S. PATENT DOCUMENTS

| | | |
|---|---|---|
| 4,822,142 | 4/1989 | Yasui .................................... 349/48 |
| 4,936,656 | 6/1990 | Yamashita et al. .................... 349/48 |
| 5,132,677 | 7/1992 | Nicholas ............................... 349/38 |
| 5,453,857 | 9/1995 | Takahara .............................. 349/48 |
| 5,457,552 | 10/1995 | Ogurtsov et al. ..................... 349/48 |

Primary Examiner—William L. Sikes
Assistant Examiner—James A. Duduk
Attorney, Agent, or Firm—Finnegan, Henderson, Farabow, Garrett & Dunner, L.L.P.

[57] ABSTRACT

An active matrix liquid crystal display comprising a plurality of address buses substantially parallel to one another, a plurality of data buses substantially perpendicular to the address buses, and a plurality of picture elements arranged in a matrix. Each picture element is surrounded by at least one common address bus and two adjacent data buses and includes at least two display electrodes separated from one another; a first switching transistor coupled between a first one of the adjacent data buses, the common address bus, and a first one of the display electrodes; a second switching transistor coupled between a second one of the adjacent data buses, the common address bus, and a second one of the display electrodes; a first capacitor coupled between the first data bus and the second display electrode; and a second capacitor coupled between the second data bus and the first display electrode.

5 Claims, 11 Drawing Sheets

ACTIVE MATRIX LIQUID CRYSTAL DISPLAY HAVING FIRST AND SECOND DISPLAY ELECTRODES CAPACITIVELY COUPLE TO SECOND AND FIRST DATA BUSES, RESPECTIVELY

A BACKGROUND OF THE INVENTION

A. Field of the Invention

The present invention relates to an active matrix liquid crystal display (LCD), and more particularly to a liquid crystal display capable of compensating for non-uniform display luminescence caused by parasitic capacitances between the display electrode and the data buses.

B. Description of the Related Art

Figure 1:
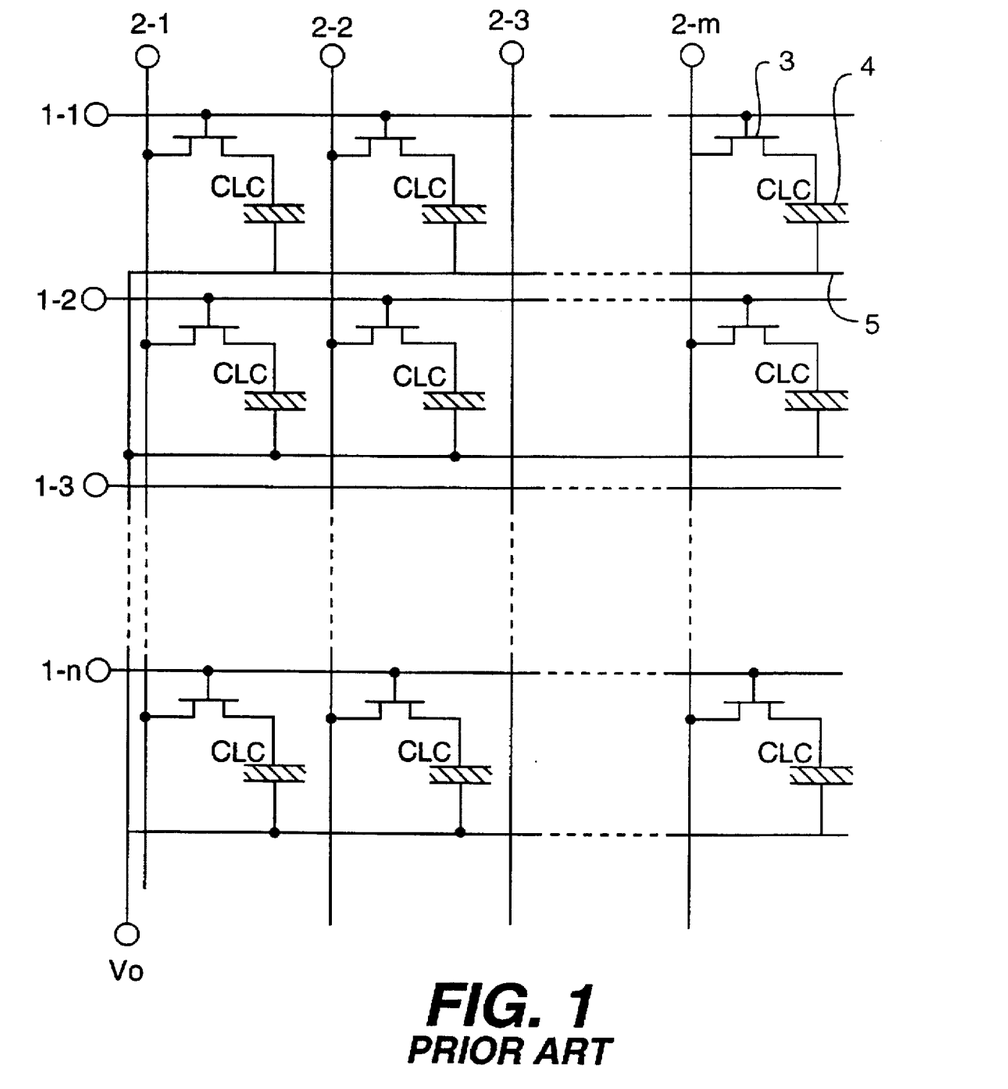
FIG. 1 is a circuit schematic representing a conventional active matrix liquid crystal display.

Several methods have been known for constructing an LCD having an active matrix. Japanese laid-open patent application 60-192369 and European patent application N0487389 are two prior art examples of active matrix LCDs. A conventional LCD structure includes two substrates between which a liquid crystal layer is immersed. Referring to FIG. 1, one of the two substrates includes an active matrix having a plurality of address buses 1—1, 1-2, . . . , 1-n; a plurality of data buses 2-1, 2—2 , . . . , 2-m orthogonal to the address buses; and a plurality of picture elements arranged in a matrix of n lines and m columns. Each picture element is surrounded by respective address and data buses, and includes a thin film switching transistor 3 (referred to hereinafter as "TFT") and a display electrode 4. The TFTs 3 are connected to respective address and data buses.

The other of the two substrates includes a common electrode 5, to which a common voltage Vo is supplied. The liquid crystal disposed between the electrodes 4 and 5 forms a capacitance $C_{Lc}$, which constitutes a storage element of each liquid crystal display cell.

However, the aforementioned LCD structure has a shortcoming in that it produces a so called "flicker" effect. The flicker effect is caused by parasitic capacitance between the gate and source of the TFT, and affects the voltage on the display electrode. The voltage at the display electrode changes by a value ΔV:

$$\Delta V = V_g \frac{C_{gs}}{C_{gs} + C_{Lc}} \quad (1)$$

where $V_g$ is the voltage at the TFT gate supplied from the address bus;

$C_{gs}$ is parasitic capacitance between the gate and source of the TFT; and $C_{Lc}$ is capacitance between the display electrode and the common electrode.

Since $C_{Lc}$ varies depending on the state of liquid crystal, the voltage change ΔV may vary from one display cell to another, making it difficult to compensate for its adverse effect.

Figure 2:
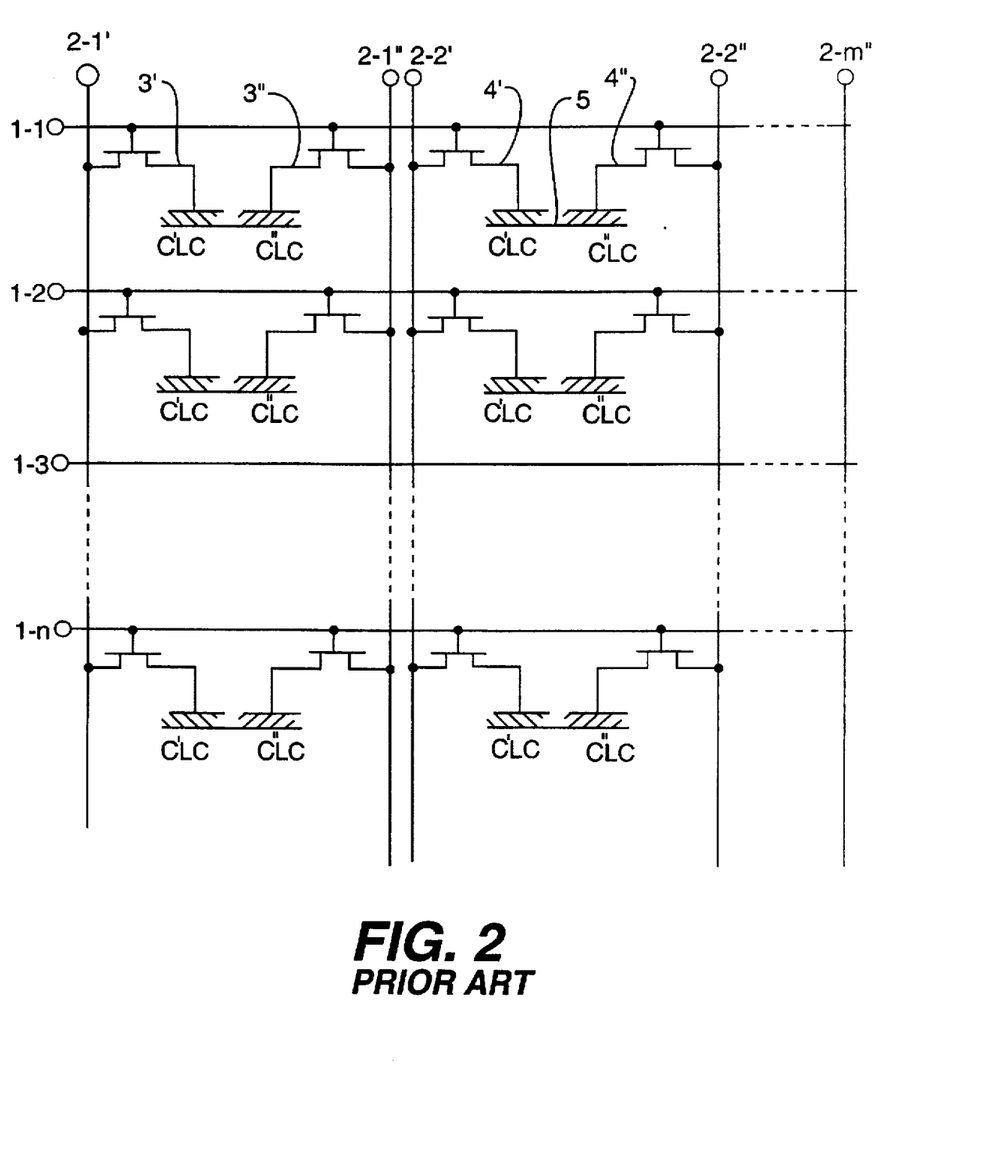
FIG. 2 is a circuit schematic representing an active matrix liquid crystal display with a "floating" common electrode.

Referring to FIG. 2, a different active matrix LCD structure attempted to eliminate the aforementioned shortcoming. In this construction, each liquid crystal cell includes two TFTs 3' and 3" having two capacitors $C'_{Lc}$ and $C''_{Lc}$ connected in series. These capacitors are formed between a respective one of two display electrodes 4' and 4" and a common electrode 5. The common electrode 5 of each cell, i.e., a "floating" electrode, is isolated from the common electrodes of the other cells. The capacitors $C'_{Lc}$ and $C''_{Lc}$ are connected via the TFT 3' and 3", respectively, to one of two data buses and one common address bus. Since the same voltage is supplied, through an equal parasitic capacitance $C_{gs}$ of the TFTs 3' and 3", from the common address bus to the electrodes 4' and 4", no voltage changes between the electrodes 4' and 4" occur. This practically eliminates the "flicker" effect.

Figure 3:
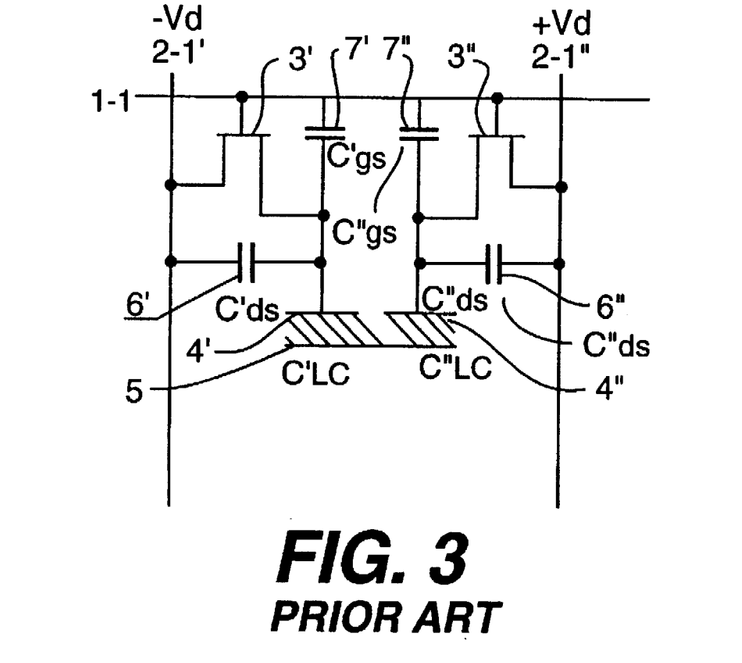
FIG. 3 is a circuit schematic representing a liquid crystal cell with parasitic capacitances between the drain and source of the switching transistors.

However, this LCD construction also has an inherent shortcoming. For example, during the first half time period of the display operation, voltages +Vd and −Vd (alternatively, +2Vd and 0) are supplied to the data buses 2-1', 2—2', . . . , 2-m' and 2-1", 2—2", . . . , 2-m", respectively, and during the second half time period, voltages −Vd and +Vd (or 0 and +2Vd) are supplied to the same data buses, respectively. In this situation, if the polarity of the video signal applied to the LCD changes, the capacitances $C'_{Lc}$ and $C''_{Lc}$ become recharged at the data buses by ΔV:

$$\Delta V = 2Vd \frac{C_{ds}}{C_{Lc} + C_{ds} + C_{gs}} \quad (2)$$

where $C_{Lc} = C'_{Lc} = C''_{Lc}$ $C_{ds} = C'_{ds} = C''_{ds}$ $C_{gs} = C'_{gs} = C''_{gs}$ More specifically, referring to FIG. 3 which shows a circuit diagram functionally representing such an LC cell, $C'_{ds}$ and $C''_{ds}$ (respectively designated 6' and 6") represent capacitances between the drain and source of the TFTs 3' and 3", respectively, and also between the display electrodes and the data buses. Likewise, $C'_{gs}$ and $C''_{gs}$ (respectively designated as 7' and 7") represent capacitances between the gate and source of the TFTs 3'and 3", respectively, and also between respective display electrodes and the common address bus.

Figure 4:
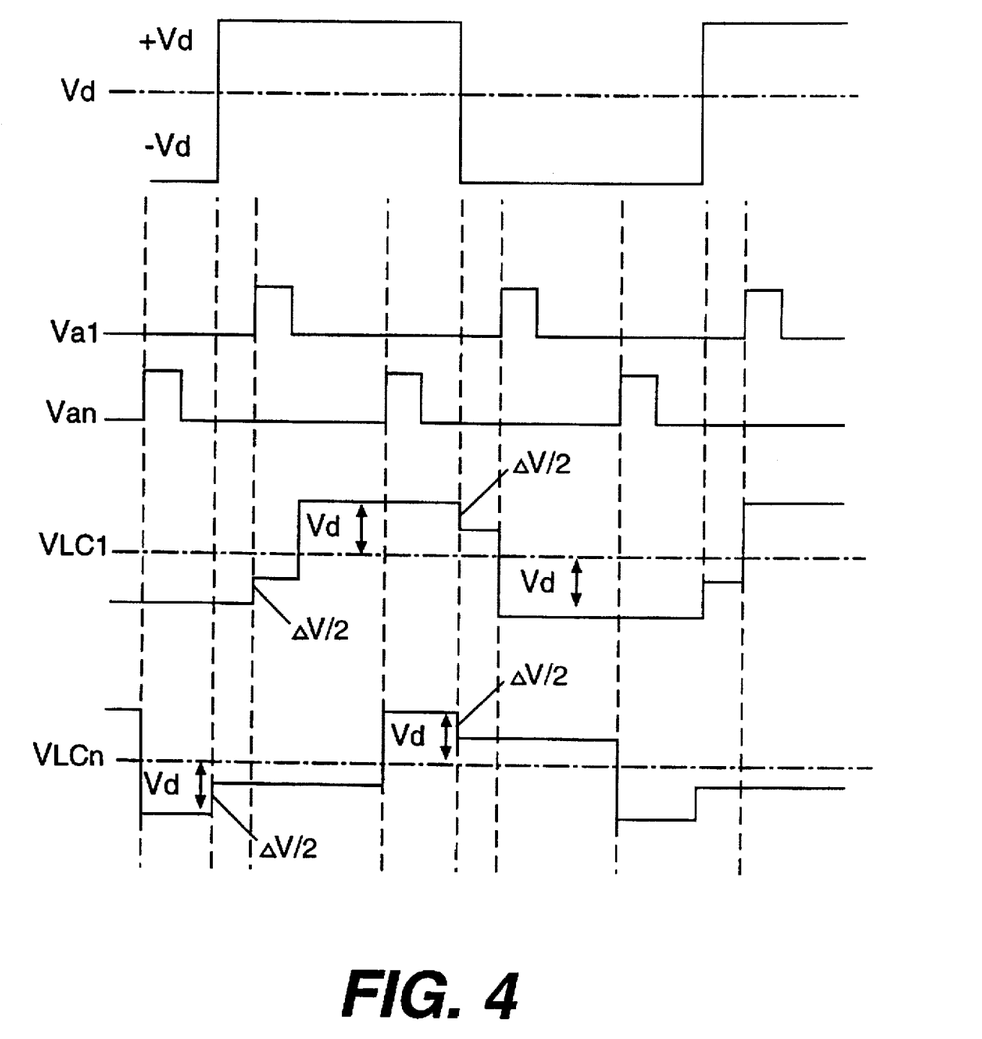
FIG. 4 is a timing diagram showing voltages at various points in a liquid crystal cell.

FIG. 4 shows a voltage waveform at various points of the circuit of FIG. 3, where $V_d$ represents a voltage at the data buses; $V_{at}$ represents a voltage at the address bus disposed in the top part of the display; $V_{an}$ represents a voltage at the address bus disposed in the bottom part of the display; and $V_{Lct}$ and $V_{Lcn}$ represent voltages between the display electrode and the common electrode of the LC cell disposed in the top and bottom parts of the display, respectively.

In the aforementioned LCD structure, the effective voltages which are applied to the top and bottom parts of the LCD cell are different from one another, and this difference results in a different luminescence between these parts. The different luminescence has the effect of significantly deteriorating the image quality. The aforementioned LCD structure also has a low operational reliability because the failure of any of the two TFTs of the picture element leads to the failure of the entire picture element. Moreover, the aforementioned LCD structure has a low aperture ratio because the reduction of the gap between the display electrodes tends to increase the capacitance between the electrodes, thus increasing the non-uniformity of display luminescence.

SUMMARY OF THE INVENTION

The present invention has been made in view of the above circumstances and has as an object of providing an active matrix LCD that obtains a high-quality image transmission by eliminating the effect of the capacitance between the display electrodes and the data buses on the voltage present at the display electrodes.

A further object of the present invention is to improve operational reliability of the active matrix LCD by providing redundant switching transistors.

An additional object of the present invention is to improve the aperture ratio of the active matrix LCD by reducing the gap between the display electrode and the data buses without adversely affecting the uniformity of the display luminescence.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects in accordance with the purpose of the invention, as embodied and broadly described herein, the active matrix liquid crystal display of this invention comprises a plurality of address buses substantially parallel to one another, a plurality of data buses substantially perpendicular to the address buses, and a plurality of picture elements arranged in a matrix.

Each of the picture elements are surrounded by at least one common address bus of the plurality of address buses and two adjacent data buses of the plurality of data buses. Each picture element includes at least two display electrodes separated from one another, a first switching transistor coupled between a first one of the adjacent data buses, the common address bus, and a first one of the display electrodes, and a second switching transistor coupled between a second one of the adjacent data buses, the common address bus, and a second one of the display electrodes. A first capacitor, coupled between the first data bus and the second display electrode, and a second capacitor, coupled between the second data bus and the first display electrode, are also included in each picture element.

BRIEF DESCRIPTION OF THE DRAWINGS

The accompanying drawings, which are incorporated in and constitute a part of this specification illustrate embodiments of the invention, and together with the description, serve to explain the objects, advantages and principles of the invention.

In the drawings.

DESCRIPTION OF THE PREFERRED EMBODIMENTS

Reference will now be made to various embodiments of the present invention, followed by a detailed description. Wherever possible, the same reference numbers will be used throughout the drawings to refer to the same or like parts.

According to one aspect of the present invention, the active matrix liquid crystal display (LCD), as embodied and broadly defined herein, preferably includes a plurality of address buses substantially parallel to one another, a plurality of address buses substantially perpendicular to the address busses, and a plurality of picture elements arranged in a matrix. Each picture element is surrounded by at least one common address bus and two adjacent data buses and includes at least two display electrodes separated from one another; a first switching transistor coupled between a first one of the adjacent data buses, the common address bus, and a first one of the display electrodes; a second switching transistor coupled between a second one of the adjacent data buses, the common address bus, and a second one of the display electrodes; a first capacitor coupled between the first data bus and the second display electrode; and a second capacitor coupled between the second data bus and the first display electrode.

According to another aspect of the present invention, the active matrix LCD preferably includes a plurality of address buses substantially parallel to one another, a plurality of data buses substantially perpendicular to the address buses, and a plurality of picture elements arranged in a matrix. Each picture element is surrounded by at least two adjacent data buses and two adjacent address buses and includes at least two display electrodes separated from one another; a first switching transistor coupled between a first one of the address buses, a first one of the data buses, and a first one of the display electrodes; a second switching transistor coupled between the first address bus, a second one of the data buses, and a second one of the display electrodes; a third switching transistor coupled between a second one of the address buses, the second data bus, and the first display electrode; and a fourth switching transistor coupled between the second address bus, the first data bus, and the second display electrode.

According to yet another aspect of the present invention, the display electrode of the active matrix LCD at least partially overlaps the address and data buses, or vice versa.

According to yet another aspect of the present invention, in the active matrix LCD, the first switching transistor has a capacitance $C'_{ds}$ between the first data bus and the first display electrode, and a capacitance $C'_{gs}$ between the common address bus and the first display electrode. The second switching transistor has a capacitance $C''_{ds}$ between the second data bus and the second display electrode, and a capacitance $C''_{gs}$ between the common address bus and the second display electrode. The first capacitor has a capacitance $C''_{ad}$ and the second capacitor has a capacitance $C'_{ad}$, where $C'_{ad}$ and $C''_{ad}$ are defined by:

$$C'_{ad} = C''_{ds} (C'_{gs}/C''_{gs})$$

$$C''_{ad} = C'_{ds} (C''_{gs}/C'_{gs}).$$

Figure 6:
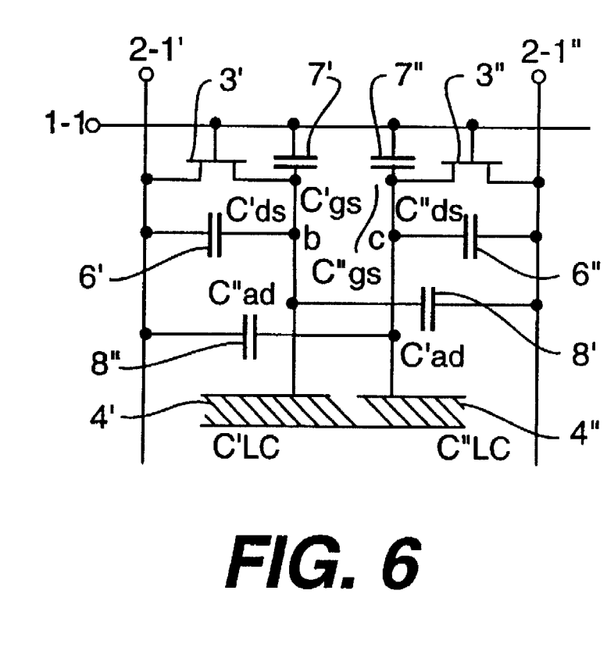
FIG. 6 is a circuit schematic representing a cell of the active matrix liquid crystal display of FIG. 5.

More specifically, according to one distinctive feature of the invention seen in FIG. 6, each picture element of the LCD includes two additional capacitors $C'_{ad}$ and $C''_{ad}$ (designated 6' and 6", respectively). The first additional capacitor $C'_{ad}$ is connected to a second data bus 2-1" and a first display electrode 4', and the second additional capacitor $C''_{ad}$ is connected to a first data bus 2-1' and a second display electrode 4".

Figure 9:
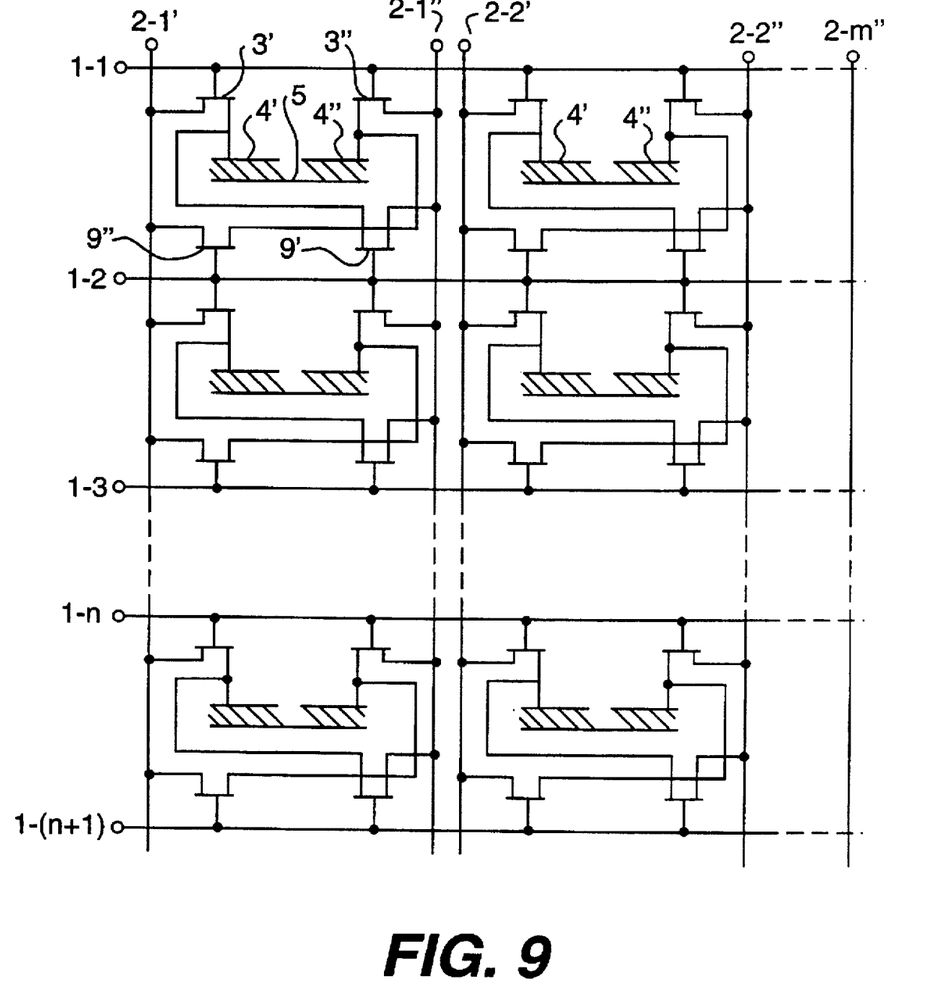
FIG. 9 is a circuit schematic representing an active matrix liquid crystal display according to yet another embodiment of the present invention.

According to another distinctive feature of the present invention seen in FIG. 9, each picture element of the LCD includes first and second additional switching transistors 9" and 9'. The drain of the first switching transistor 9" is connected to the first data bus 2-1' and its source is connected to the second display electrode 4". Likewise, the drain of the second switching transistor 9' is connected to the first display electrode 4' and its source is connected to the second data bus 2-1". The gate of each additional switching transistor is connected to a common address bus 1-2.

According to yet another distinctive feature of the present invention, capacitors $C'_{ad}$, $C''_{ad}$, $C'_{ds}$, $C''_{ds}$, $C'_{gs}$, and $C''_{gs}$ are formed either by at least partially overlapping the data and address buses over the display electrodes or at least partially overlapping the display electrodes over the data and address buses.

According to yet another distinctive feature of the present invention, the capacitance of the capacitors $C'_{ad}$, $C''_{ad}$, $C'_{ds}$, $C''_{ds}$, $C'_{gs}$, and $C''_{gs}$ have a relationship as follows:

$$C''_{ad} = C'_{ds}\frac{C''_{gs}}{C'_{gs}}$$

$$C'_{ad} = C''_{ds}\frac{C'_{gs}}{C''_{gs}}$$

Further, as discussed above, in the conventional art, changes in the polarity of the video signal cause the capacitances $C'_{Lc}$ and $C''_{Lc}$ to recharge at the data buses by the value $\Delta V$ :

$$\Delta V = 2Vd \frac{C_{ds}}{C_{Lc} + C_{ds} + C_{gs}}$$

Therefore, in the conventional art, the effective voltage between the display electrode and the common electrode will have a value approximately equivalent to Vd for the liquid and approximately disposed in the top part of the display and approximately equivalent to $(Vd-\Delta V/2)$ for those at the bottom part of the display. This causes differences in luminescence between the top and bottom parts of the display.

Figure 5:
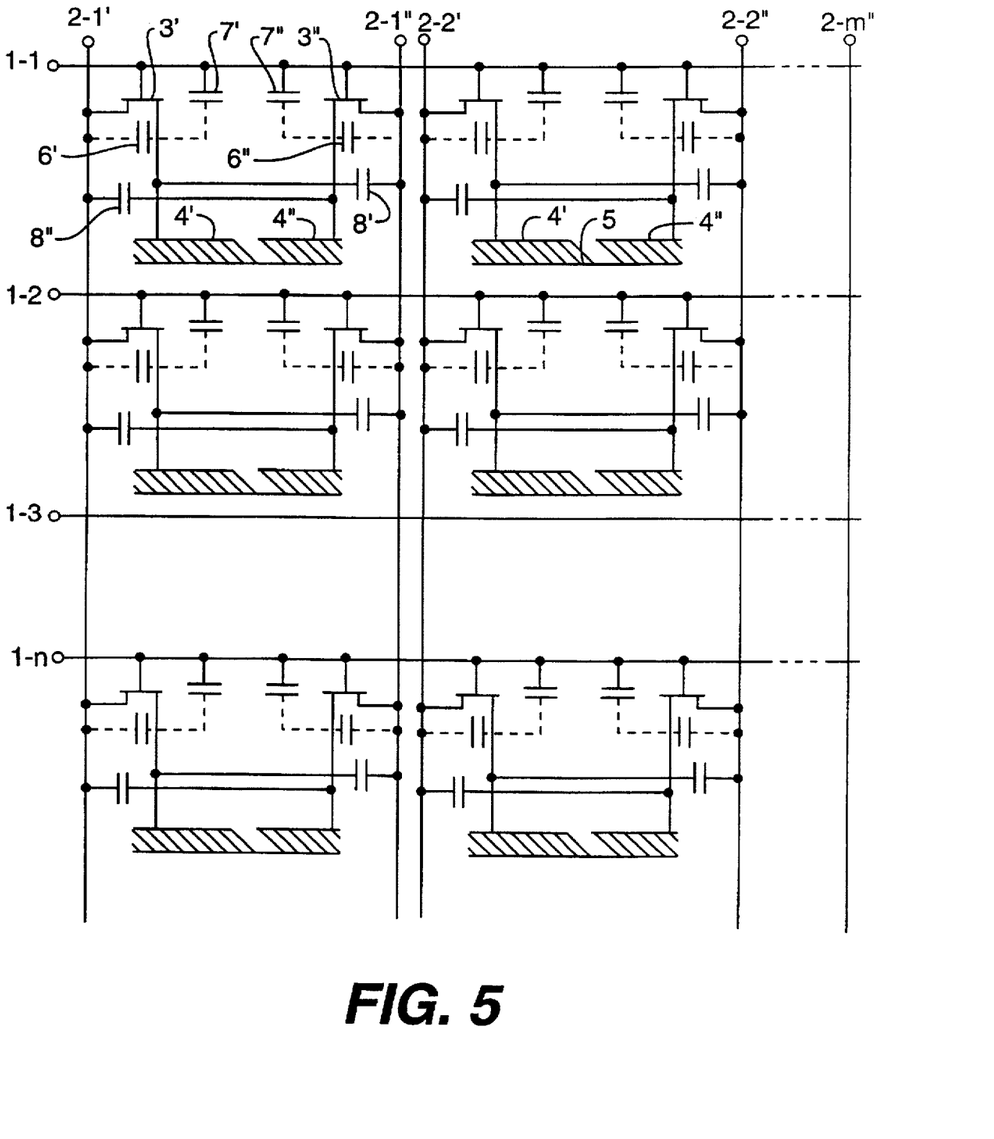
FIG. 5 is a circuit schematic representing an active matrix liquid crystal display according to an embodiment of the present invention.

On the other hand, according to the embodiment of the present invention seen in FIG. 5, the active matrix LCD structure includes additional capacitors 8' and 8". Each capacitor 8' and 8" is connected between a respective display electrode and a respective data bus, making it possible to have a small value of $\Delta V$. This eliminates the non-uniformity of luminescence between the different parts of the display. FIG. 6 shows an equivalent circuit of one liquid crystal cell having additional capacitances $C'_{ad}$ and $C''_{ad}$.

In order to completely eliminate the non-uniformity of luminescence between the top and bottom parts of the display, the additional capacitances $C'_{ad}$ and $C''_{ad}$ are preferably determined to satisfy the following condition. Referring to FIG. 6, should the voltage change across the data buses 2-1' and 2'1" (transistors 3' and 3" being switched off), the voltage change at points "b" and "c" should be identical to one another in magnitude and polarity. If this condition is met, the capacitance $C'_{Lc}$ and $C''_{Lc}$ do not recharge, even if the voltage across the data buses 2-1'and 2-1" changes. This condition may be expressed as follows:

$$\frac{C_{ds}}{C_{ds} + C'_{gs} + C'_{ad}} = \frac{C''_{ad}}{C''_{ds} + C''_{gs} + C''_{ad}} \quad (3)$$

$$\frac{C''_{ds}}{C_{ds} + C''_{gs} + C''_{ad}} = \frac{C'_{ad}}{C_{ds} + C'_{gs} + C_{ad}} \quad (4)$$

Further, if $C'_{gs}$ and $C''_{gs}$ are large, it is necessary to satisfy one additional condition to eliminate the display flicker effect caused by the recharging of $C'_{Lc}$ and $C''_{Lc}$ due to the voltage change on the address bus 1—1. If the voltage changes on the address bus 1—1 (with transistors 3' and 3" being switched off), the voltage change at points "b" and "c" should be identical to one another in magnitude and polarity. If this condition is satisfied, the recharge of the capacitances $C'_{Lc}$ and $C''_{Lc}$ would not occur, even if the voltage changes on the address bus 1—1. This condition may be expressed as follows:

$$\frac{C'_{gs}}{C'_{gs} + C'_{ds} + C'_{ad}} = \frac{C''_{gs}}{C''_{gs} + C''_{ds} + C''_{ad}} \quad (5)$$

Combining equations (3), (4), and (5) with respect to $C'_{ad}$ and $C''_{ad}$:

$$C'_{ad} = C''_{ds}\frac{C'_{gs}}{C''_{gs}} \quad (6)$$

$$C''_{ad} = C'_{ds}\frac{C''_{gs}}{C'_{gs}}$$

It is typical in the active matrix display structures that:

$$C'_{gs} = C''_{gs} = _{gs}$$

$$C'_{ad} = C''_{ds}; \text{ and}$$

$$C''_{ad} = C'_{ds} \quad (7)$$

The determination of $C'_{ad}$ and $C''_{ad}$ in accordance with equations (6) and (7) ensures the elimination of the non-uniform display luminescence as well as the flicker effect in the LCD display structure.

In order to improve the operational reliability of the active matrix LCD, the LCD structure preferably includes two additional switching transistors. These two transistors function as the two additional capacitors $C'_{ad}$ and $C''_{ad}$ described above. The capacitance between the drain and source and the capacitance between the gate and source of each of these transistors are preferably determined in accordance with equations (6) or (7).

FIG. 9 shows a circuit diagram of the LCD having the additional switching transistors 9" and 9". The source of the switching transistor 9" is connected to the display electrode 4", while the drain is connected to the data bus 2-1'. The source of the switching transistor 9' is connected to the data bus 2-1", while the drain is connected to the display electrode 4'. The gates of both the switching transistors are commonly connected to address bus 1-2. The gates of a pair of additional switching transistors corresponding to the address bus 1-n are commonly connected to an address bus 1-(n+1). Due to the presence of these additional switching transistors, the failure of one or two of the switching transistors connected to one of the address buses and disposed in one of the liquid crystal cells would not cause the failure of a corresponding cell. Therefore, the operational reliability of such an active matrix LCD is improved.

Figure 8:
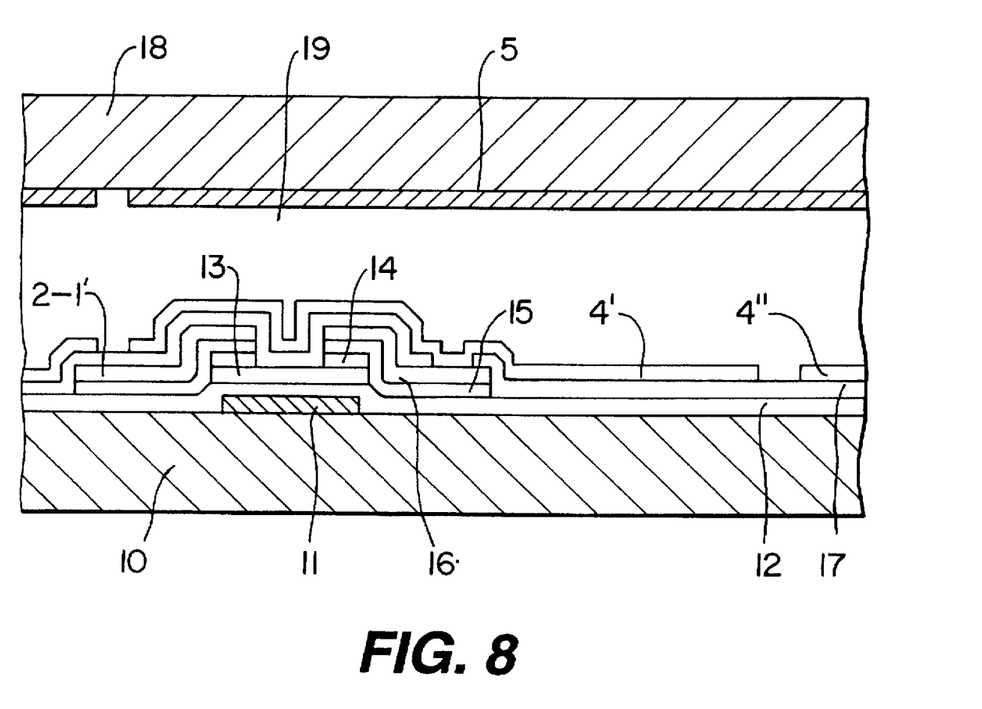
FIG. 8 is a cross-sectional view taken along 8—8 of FIG. 7.

In order to increase the aperture ratio of the LCD, the capacitors $C'_{ad}$, $C''_{ad}$, $C'_{ds}$, $C''_{ds}$, $C'_{gs}$, $C''_{gs}$ are formed by overlapping the data and address buses with the display electrode, or alternatively, by overlapping the display electrodes with the data and address buses. FIG. 8 shows a sectional view of a portion of the LCD active matrix, as embodied herein. The display electrodes 4' and 4" overlap the data buses 2-1' and 2-1" and the address bus 1—1, forming the capacitors $C'_{ad}$, $C''_{ad}$, $C'_{ds}$, $C''_{ds}$, $C'_{gs}$, and $C''_{gs}$ in those overlapped areas. Such an LCD construction ensures a high aperture ratio.

Now, reference will be made in detail to the present preferred embodiments of the invention.

According to one embodiment of the present invention seen in FIGS. 5 and 6, the liquid crystal display preferably includes additional capacitors $C'_{ad}$ and $C''_{ad}$ designated as 8' and 8". FIG. 4 shows a timing diagram representing voltage waveforms at various points in the LCD cell, for example, $V_d$ at the data buses, $V_{al}$ and $V_{an}$ at the address buses, and $V_{LCl}$ and $V_{LCn}$ at liquid crystal capacitors $C'_{Lc}$ and $C''_{Lc}$ formed between a respective one of display electrodes 4' and 4" and a common electrode 5.

The operation of the circuit is described below with reference to FIGS. 4, 5, and 6. When the voltage $V_{al}$ or $V_{an}$ appears at the address bus, switching transistors 3' and 3" become deactivated and the capacitor $C'_{Lc}$ charges to the voltage +Vd while the capacitor $C''_{Lc}$ charges to the voltage −Vd (or vice versa). In this case, the common electrode 5 is maintained at a zero voltage with respect to the electrode 4' and 4". Normally, in the LCD circuit, a change in the polarity of the voltage at the data bus (for example, from +Vd to −Vd or vice versa) in the absence of the voltage $V_d$ at the address bus, causes the capacitors $C'_{Lc}$ and $C''_{Lc}$ to recharge by a value ΔV defined by the capacitance $C'_{ds}$, $C''_{ds}$, $C'_{gs}$, and $C''_{gs}$, which are parasitic capacitance existing between the display electrodes and the data and address buses.

In order to eliminate the effects of these parasitic capacitors, the LCD, as embodied herein, includes two additional capacitors $C'_{ad}$ and $C''_{ad}$, as shown in FIG. 5 at 8' and 8". To prevent the recharging of the capacitors $C'_{Lc}$ and $C''_{Lc}$, consequently eliminating non-uniform luminescence in the display, the capacitance of $C'_{ad}$ and $C''_{ad}$ are chosen in such a way (for example, in accordance with the equations (3) and (4) above) that, should the voltage change at any data bus, the voltage change at the display electrodes 4' and 4" of the same picture element will be identical in magnitude and polarity.

Figure 7:
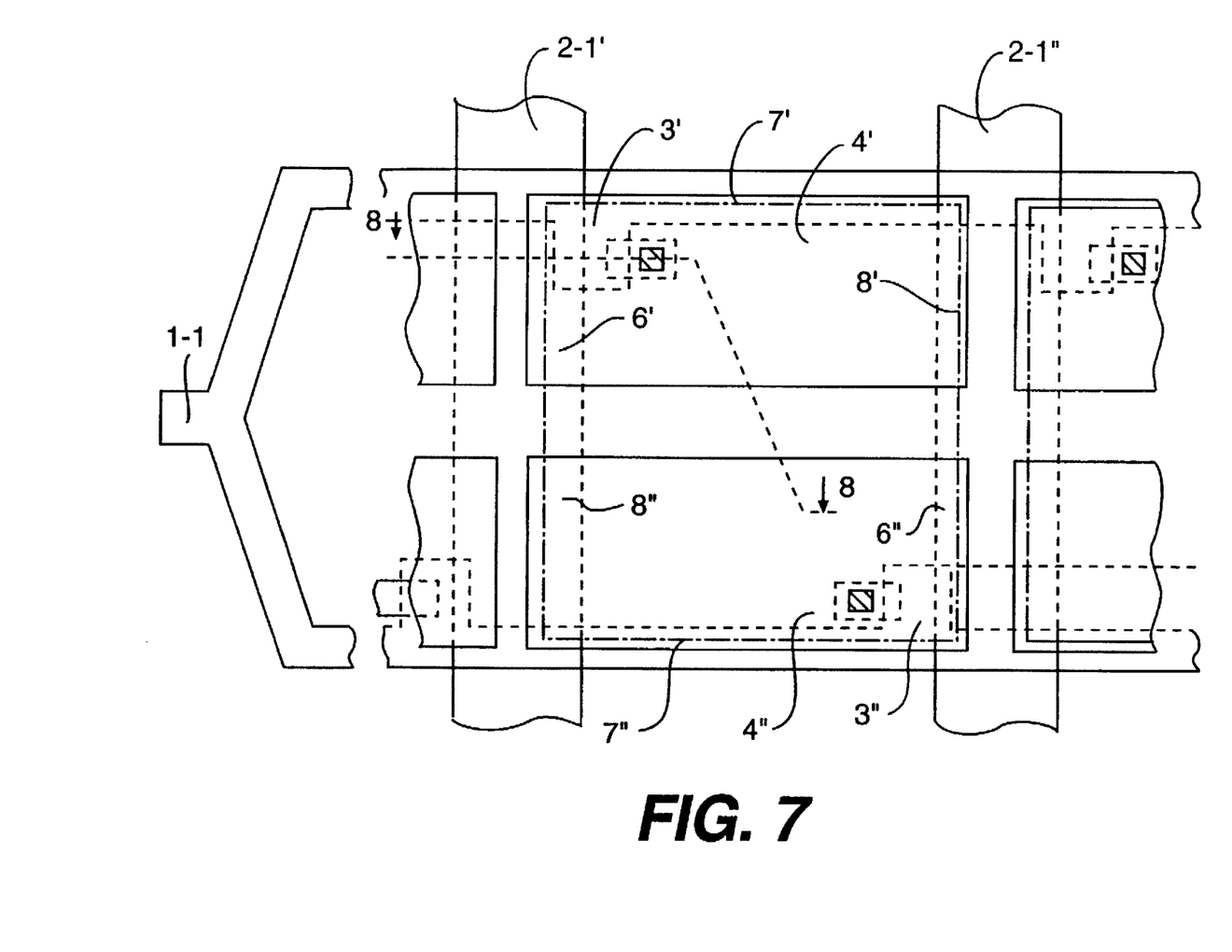
FIG. 7 is a plan view of a portion of an active matrix liquid crystal display according to another embodiment of the present invention.

Another aspect of the present invention is explained below in reference to FIGS. 7 and 8. Referring to FIG. 7, the liquid crystal display includes capacitors $C'_{ad}$, $C''_{ad}$, $C'_{ds}$, $C''_{ds}$, $C'_{gs}$, and $C''_{gs}$ (designated as 8', 8", 6', 6", 7', 7", respectively). These capacitors are formed by at least partially overlapping the data buses 2-1' and 2-1" and address bus 1—1 with the display electrodes 4' and 4".

The sequence of forming these overlapping layers is explained with reference to FIG. 8. A chromium film is deposited on a substrate 10 by vacuum sputtering. Using photolithography, the address buses (not shown) and gates 11 of the switching transistors are formed in the chromium film. Then, a silicon nitride film 12 used as a gate dielectric is deposited. Thereafter, a film of high ohmic amorphous silicon 13 and a film of amorphous silicon doped with phosphorus 14 are successively deposited. Using photolithography, semiconductor regions of the switching transistors are formed (not shown for drawing simplification).

Then, a chromium film 15 and an aluminum film 16 are successively deposited, and the data buses and the drain and source region of the switching transistors are formed using photolithography and chemical etching. In order to form a low resistive contact to the amorphous silicon, the doped amorphous silicon 14 is selectively etched with a high resistivity silicon in the regions between the drain and source of the switching transistors.

Thereafter, a silicon nitride film 17 is deposited to serve as a protective dielectric, and contact windows to the source regions of the switching transistors are opened therein using photolithography. Then, a transparent conducting film of indium oxide is deposited, and by photolithography, display electrodes 4' and 4" are formed therein. Thereafter, a transparent conducting film of indium oxide is deposited on a second isolating substrate 18, and the common electrodes 5, isolated from one another, are formed using photolithography.

Then, the substrates 10 and 18 are vertically aligned with respect to one another having a space defined by the dimensions of spacers disposed between the substrates (not shown in FIG. 8). The alignment of the substrates is carried out in such a way that the common electrode is disposed over the display electrodes 4'and 4". The disposition of the common electrode is shown in FIG. 7 with a dot-and-dash line. Then, the space between the substrates is filled with liquid crystal 19.

The above mentioned method is only an example for the manufacture of a transmissional type of LCD. In the case of manufacturing LCDs of a reflective type, a reflective metal film (for example, an aluminum film) is used instead of an indium oxide film to form the display electrodes.

From the above description, one can see that the aperture ratio of the aforementioned LCD, as embodied herein, is very high since the display electrodes occupy practically the entire display area, excluding the gap between the electrodes. Further, since it is easy to vary the area of overlapping between the display electrodes and the data buses, the desirable relation between the capacitance $C'_{ad}$, $C''_{ad}$, $C'_{ds}$, $C''_{ds}$, $C'_{gs}$, and $C''_{gs}$ in compliance with equations (3), (4), and (5) can be easily obtained.

Another embodiment of the present invention is described with reference to FIG. 9. The LCD preferably includes two additional switching transistors 9' and 9". The capacitance existing between the drain and source of the additional switching transistors serve as additional capacitors $C'_{ad}$ and $C''_{ad}$. Such a circuit is advantageous particularly when all switching transistors are identical and have equal capacitances between electrodes. In this case, the conditions of the capacitance $C'_{ad}$, $C''_{ad}$, $C'_{ds}$, $C''_{ds}$, $C'_{gs}$, and $C''_{gs}$ set forth in the equations (8) and (7) are automatically satisfied. In addition, such an LCD provides a high operational reliability because the switching transistors 9' and 9" can function as redundant transistors. Consequently, the failure of one or two switching transistors of any pair of the switching transistors 3', 3" or 9', 9" would not cause operational failure of the picture element.

Figure 10:
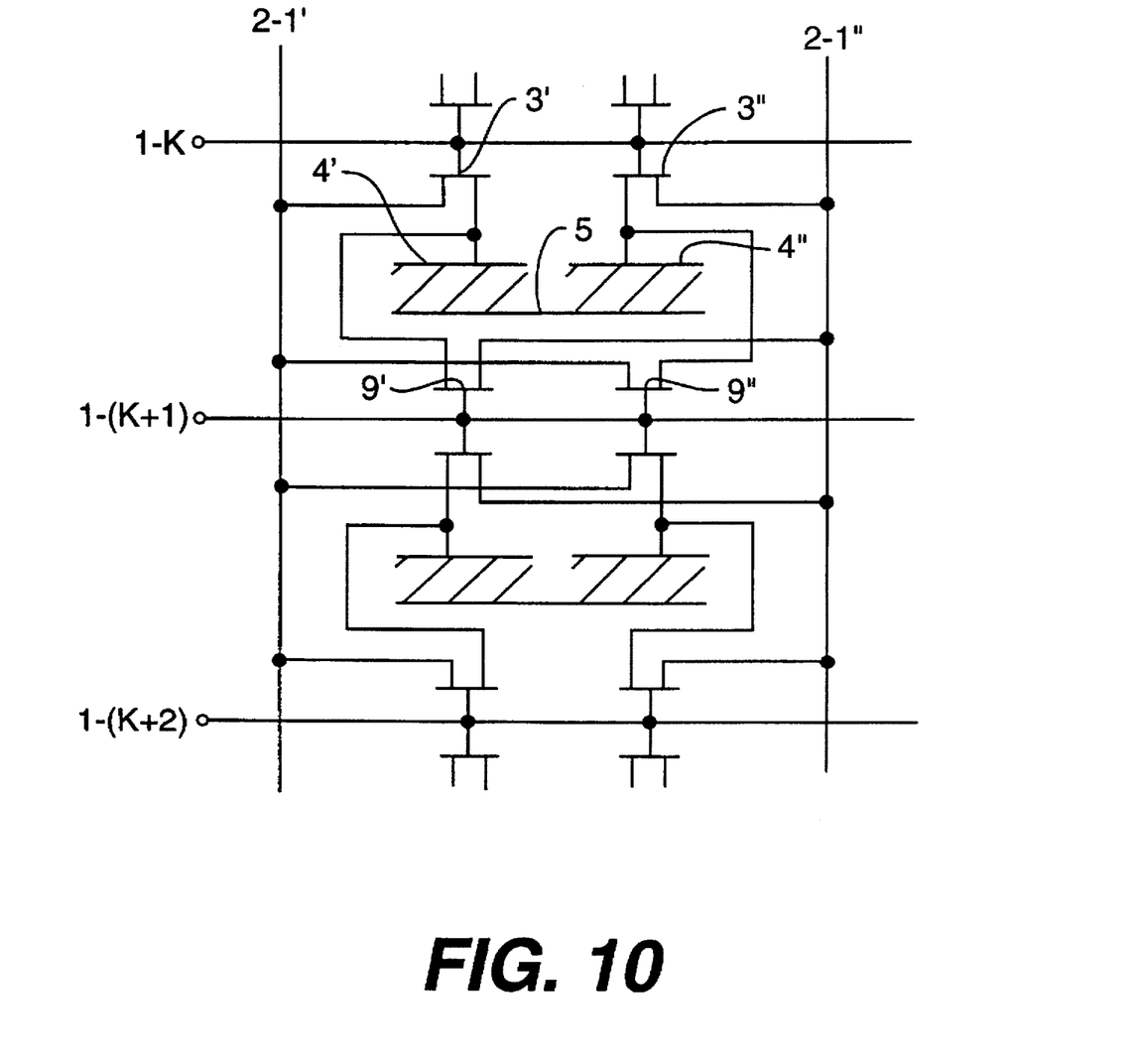
FIG. 10 is a circuit schematic representing a liquid crystal cell of the active matrix liquid crystal display of FIG. 9.

FIG. 10 shows a slight variation from the LCD structure of FIG. 6. In this variation, the switching transistors of the matrix adjacent lines connected to one address bus have the same connections of the drains and sources to the data buses and display electrodes.

Figure 11:
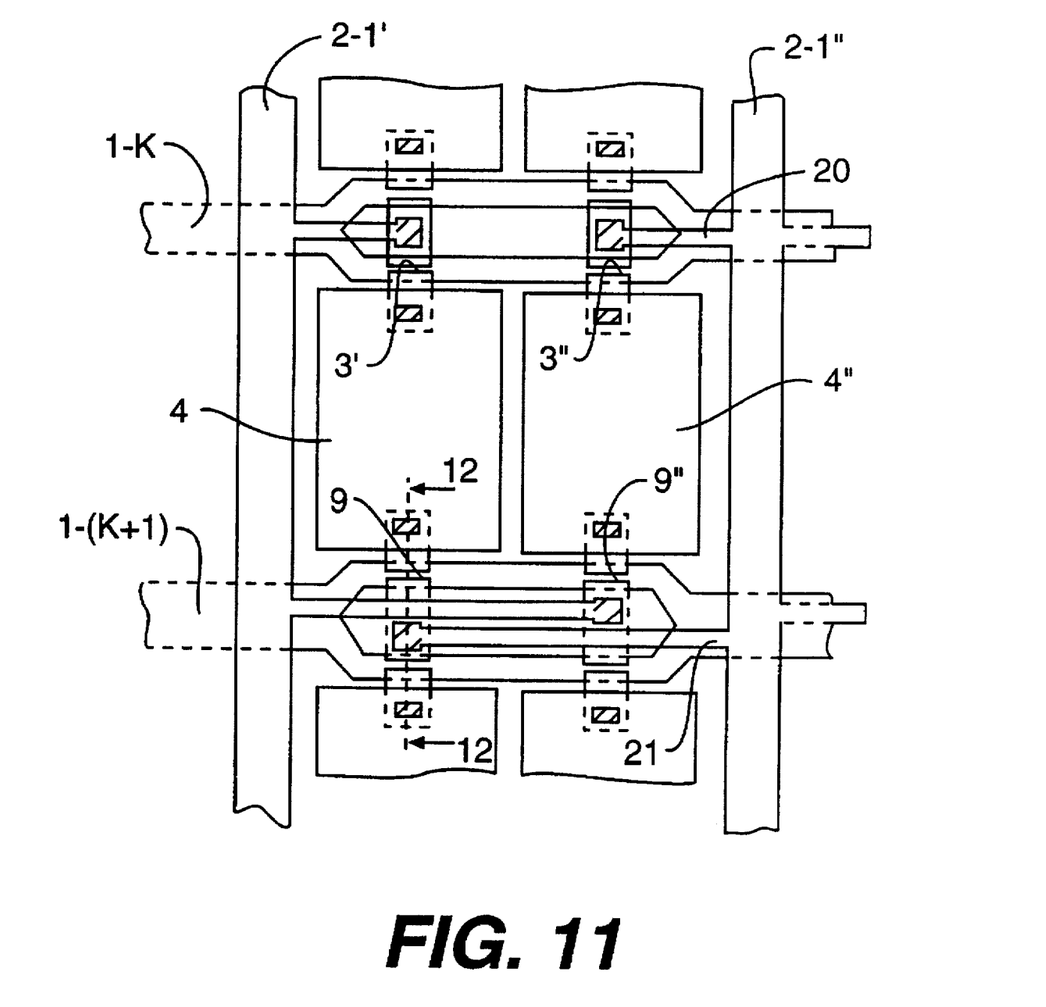
FIG. 11 is a plan view of a portion of the active matrix liquid crystal display according to yet another embodiment of the present invention.
Figure 12:
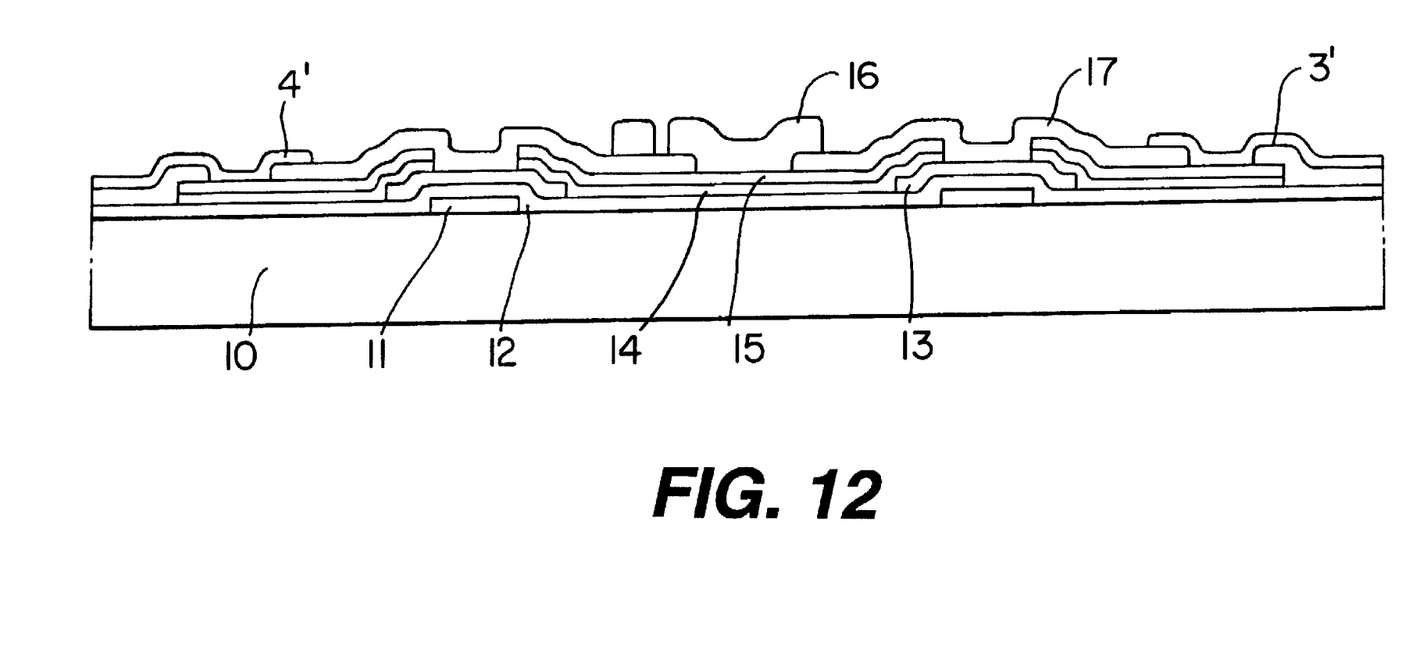
FIG. 12 is a cross-sectional view taken along 12—12 of FIG. 11.

FIG. 11 shows a plan view of a portion of the LCD in FIG. 10. FIG. 12 shows a cross-sectional view along 12—12 of FIG. 11. An exemplary sequence of forming layers during manufacturing of the LCD having two additional switching transistors, as embodied herein, is explained hereinbelow in reference to FIGS. 11 and 12.

Chromium, nitride, silicon, amorphous, silicon, boron doped silicon and chromium layers are sequentially deposited on an isolated substrate 10, and by photolithography, an address bus 11, a gate dielectric of the switching transistors 12, semiconductor regions 13, and drain and source regions of the switching transistors 14 and 15 are formed in the same sequence as that shown in FIG. 8.

Then, an isolating dielectric 17 (silicon nitride) is deposited. Contact windows to the source and drain electrodes of the switching transistors are formed in the isolating dielectric, and then an aluminum film 16 is formed. Using photolithography, data buses and links 20 and 21 (FIG. 11) to the drain electrodes of the switching transistors are formed in the aluminum film. Thereafter, a conducting film of indium oxide is deposited, and display electrodes are formed for the LCDs of a transmissional type. For the LCDs of a reflective type, the display electrodes are formed from the same material as the data buses (for example, from aluminum) simultaneously with the data buses in the same photolithographical process.

To simplify the drawing, a cross-section of one substrate is shown in FIG. 12. The LCD elements disposed on the second substrate are manufactured in the same manner as discussed above in reference to building the LCD structure of FIG. 5. The use of links 20 and 21 (shown in FIG. 11) facilitates separating the failed switching transistors from the data buses by laser burning or chemical etching.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An active matrix liquid crystal display, comprising:
   a plurality of address buses substantially parallel to one another;
   a plurality of data buses substantially perpendicular to the address buses; and
   a plurality of picture elements arranged in a matrix, each picture element being surrounded by at least one common address bus of the plurality of address buses and two adjacent data buses of the plurality of data buses, and including:
      at least two display electrodes separated from one another;
      a first switching transistor coupled between a first one of the adjacent data buses, the common address bus, and a first one of the display electrodes;
      a second switching transistor coupled between a second one of the adjacent data buses, the common address bus, and a second one of the display electrodes;
      a first capacitor coupled between the first data bus and the second display electrode; and
      a second capacitor coupled between the second data bus and the first display electrode.

2. The active matrix liquid crystal display of claim 1, wherein the first switching transistor has a capacitance $C'_{ds}$ between the first data bus and first display electrode, and a capacitance $C'_{gs}$ between the common address bus and the first display electrode; the second switching transistor has a capacitance $C''_{ds}$ between the second data bus and second display electrode, and a capacitance $C''_{gs}$ between the common address bus and the second display electrode; the first capacitor has a capacitance $C''_{ad}$; and the second capacitor has a capacitance $C'_{ad}$, and wherein $$C'_{ad} = C''_{ds}(C'_{gs}/C''_{gs}) \text{ and}$$

$$C''_{ad} = C'_{ds}(C''_{gs}/C'_{gs}).$$

3. The active matrix liquid crystal display of claim 1, wherein the display electrodes at least partially overlap the address bus and the data bus.

4. An active matrix liquid crystal display, comprising:
   a plurality of address buses substantially parallel to one another;
   a plurality of data buses substantially perpendicular to the address buses; and
   a plurality of picture elements arranged in a matrix, each picture element being surrounded by at least two adjacent data buses and two adjacent address buses, and including:
      at least two display electrodes separated from one another;
      a first switching transistor coupled between a first one of the address buses, a first one of the data buses, and a first one of the display electrodes;
      a second switching transistor coupled between the first one of the address buses, a second one of the data buses, and a second one of the display electrodes;
      a third switching transistor coupled between a second one of the address buses, the second one of the data buses, and the first one of the display electrodes; and
      a fourth switching transistor coupled between the second one of the address buses, the first one of the data buses, and the second one of the display electrodes.

5. The active matrix liquid crystal display of claim 2, wherein the display electrodes at least partially overlap the address bus and the data bus.

* * * * *